United States Patent [19]

St. Clair

[11] 3,997,112
[45] Dec. 14, 1976

[54] YEAR ROUND COOLING WATER FROM THE COLD WEATHER OF WINTER

[76] Inventor: John C. St. Clair, Box 216, R.R. 5, London, Ohio 43140

[22] Filed: July 18, 1975

[21] Appl. No.: 597,016

Related U.S. Application Data

[63] Continuation of Ser. No. 446,489, Feb. 27, 1974, abandoned.

[52] U.S. Cl. ............................. 239/13; 239/200; 239/280; 47/58; 61/1 R; 62/260; 137/236; 165/45

[51] Int. Cl.² ................. B05B 17/04; A01G 25/00; F25D 1/02

[58] Field of Search .................. 239/1, 2 R, 13, 14, 239/273, 200, 208, 280; 47/58; 137/236; 165/45; 62/260; 61/1 R, 11, 12

[56] References Cited

UNITED STATES PATENTS

| 660,772 | 10/1900 | Guthrie | 62/260 X |
|---|---|---|---|
| 1,233,119 | 7/1917 | Parker | 239/200 X |
| 1,576,867 | 3/1926 | Swan | 62/260 X |
| 1,585,181 | 5/1926 | Blankenship | 61/1 R X |
| 1,632,611 | 6/1927 | Lloyd | 239/280 |
| 3,331,207 | 7/1967 | McGrew et al. | 137/236 X |
| 3,340,648 | 9/1967 | Frantzen | 47/58 |
| 3,501,917 | 3/1970 | Detter | 61/1 R |
| 3,537,267 | 11/1970 | Webb | 137/236 X |
| 3,701,260 | 10/1972 | Soileau | 61/12 |
| 3,747,907 | 7/1973 | Anderson | 165/45 X |
| 3,760,868 | 9/1973 | Cywin | 165/45 X |

*Primary Examiner*—Robert S. Ward, Jr.

[57] ABSTRACT

Cooling water at 39° F is made available at low cost all year round by erecting towers in farmer's fields and spraying the water in the air around the towers to cool the water during the winter. The cooled water is collected and stored in a lake. During the summer the same towers and water spraying system is used to act as a permanent irrigation system with the water from the lake sprayed when needed on the farmer's crops. Since the users of the cold water from the lake for cooling water have to and can easily afford to pay for the whole system, which includes a very good drainage system, farmers will greatly profit and therefore greatly favor the installation of such a system on their farms.

With such a system the installers and owners of such a system can put polluting substances, in the irrigation water, that normally cannot be dumped in rivers, and the farmer's fields will act as a cost-less area where bacteria break down most polluting substances such as most industrial chemicals and sewage liquids.

Electric lights can be installed on the towers and the farmers fields can be illuminated during the night and the crop yields increased by 10 to 25 percent, additionally.

1 Claim, 1 Drawing Figure

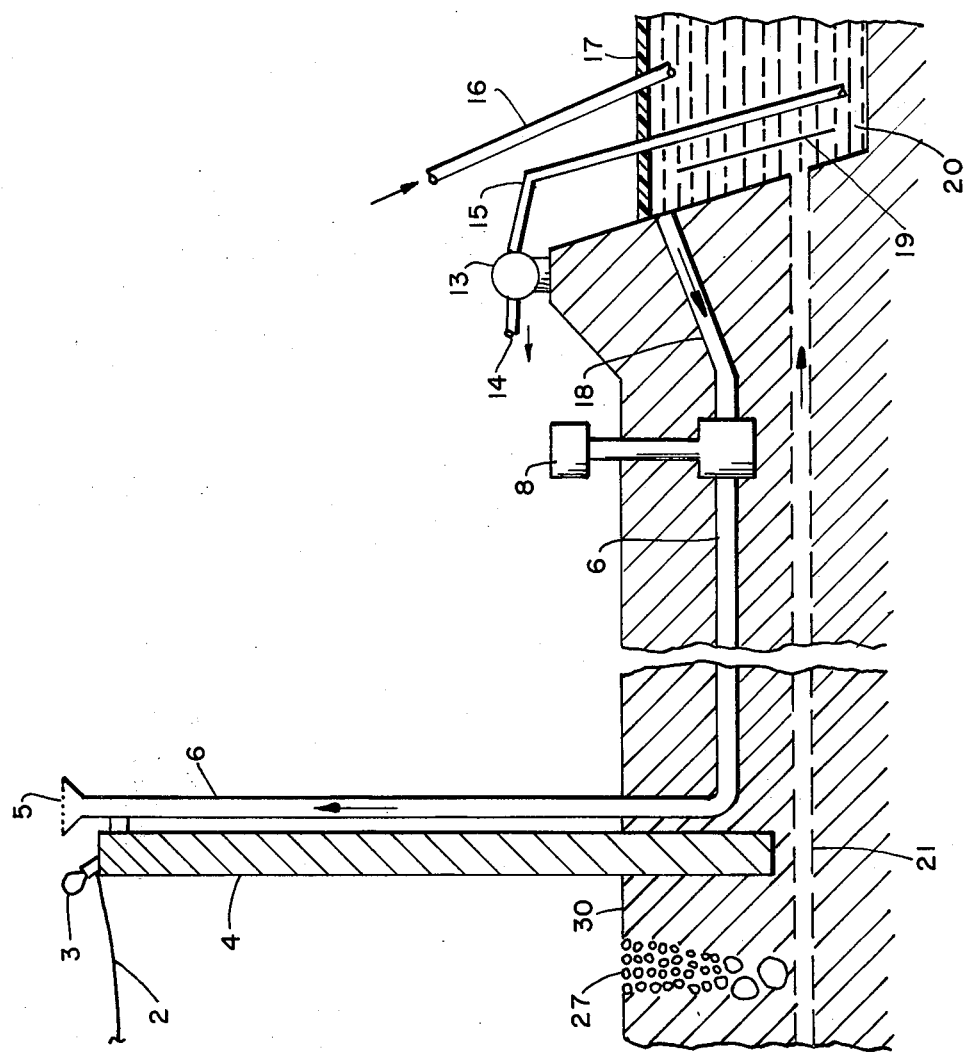

YEAR ROUND COOLING WATER FROM THE COLD WEATHER OF WINTER

This is a continuation of application Ser. No. 446,489 filed Feb. 27, 1974, and now abandoned.

BACKGROUND OF THE INVENTION

A major problem of industry, and the electric power companies in particular, is that their processes require cooling water in great quantity. This has preferably been done in the past by locating plants beside major rivers and pumping out some of the river water and, after the water has been used and heated, returning it to the river to flow down stream. Because of the great expansion of industry, and especially expansion of the power companies, many rivers have been heated to the point where fish have been killed and the temperature of the river water has been raised to a temperature where it is unsatisfactory to the subsequent plants down stream that use the river for cooling.

SUMMARY OF THE INVENTION

An object of this invention is to not only prevent harm to rivers by their use for cooling but to also lower the temperature of the cooling water obtained so its increased value to the users will more than pay for the cost of the method for producing the cooling water.

Another object of this invention is to reduce the evaporation of water that normally occurs when cooling is done in the summer by water which is a great financial disadvantage to many industries located where water is scarce.

Another object of this invention is to allow towers and other facilities in the disclosed invention to have two uses. They cool water, for use by industry, in the winter and they provide water storage for irrigation water and irrigate farm land in the summer during periods of drought. In this way what would be uneconomically justified for industry or farmers to do alone becomes very practical when the farmers use the equipment in the summer and industry uses the same equipment during the winter.

Another object of this invention is to provide towers not only for the above uses but that can also be used to mount electric lights to provide illumination during the night to increase the yields of crops additionally by 10 to 25 percent.

Another object of this invention is to provide a method for industries to dispose of their polluting water soluble wastes, instead of dumping them in rivers which is no longer permitted. Most water soluble wastes from industry can be handled in irrigation water if spread over a great enough area of land. The soil absorbs the polluting substances and the bacteria will destroy most industrial wastes. Similarly cities can dispose of their sewage water at very low cost by this method and eliminate the need for expensive sewage disposal plants.

BRIEF DESCRIPTION OF THE DRAWING

The drawing schematically shows one form of the invention.

DETAILED DESCRIPTION OF THE INVENTION

In the drawing we see a tower at 4 which in a preferred case would be a telephone pole whose top is 25 feet above the surface of the ground 30. On the top of the tower 4 is a spray nozzle 5 which, when desired, sprays water supplied by pipe line 6 over the surrounding ground. Normally in the winter months a big capacity spray nozzle will be used for nozzle 5 when water is cooled, and for the rest of the year the spray nozzle 5 will be changed to a nozzle of small capacity for irrigating the surrounding land and for protecting the crops from frost.

In the winter time the spray from spray nozzle 5 is cooled by the cold air. At the low temperature normally prevalent during the winter months the vapor pressure of water is always low and most of the cooling can be done with loss of little water by evaporation. The cooled water in the winter flows at least partially through the ground to drain tile 21 to water storage lake 20 where it is stored until it is needed the rest of the year.

However careful study should be applied to each individual case of getting large amounts of cooled water in the winter time back to storage lake 20. The Agriculture departments of the various states put out publications to help their farmers design their drainage systems and engineers working in the drainage field constantly refer to such publications. The *Drainage Guide* 1965 sold by the State of Ohio's Extension Service, Ohio Dept. of Natural Resources, Divisions of Lands and Soil, Columbus, Ohio, is very helpful for the State of Ohio and much surrounding land.

It is highly desirable to first make tests on how good internal drainage of the particular soil is since soils can vary very much even in farms close together. Spray irrigation of many soils is not recommended at rates higher than 0.5 inches per hour if surface run off is to be avoided. For instance in many cases trouble is encountered with septic tank rural sewage disposal systems and these normally require soils that will absorb water at a rate of over 1 inch per hour. This is measured by digging a hole 1 foot square about 2 feet deep, putting 6 inches depth of water in the hole and measuring the rate the water level falls.

Therefore, while installing an enlarged regular underground tile system is necessary in about all soils, it is very frequently desirable to do considerable grading so the most of the water, when sprayed on at rates faster than desirable for irrigation, is carried off by gently sloping grass sod covered ditches. In the drawing is shown a blind drain 27 where surface water flowing over the surface of the ground can flow directly into tile drain 21. The blind drain 27 is filled with a graded mixture of rock and gravel to filter out debris. Blind drains have the one objection of letting sediment flow into the tile which can settle out in the tile at low flow rates. Such devices as settling out the sediment in a level R area before the water enters tile drain 21 are preferred.

There is also the question of erosion of the land occuring in the winter when rates faster than 2 inches per day of water are sprayed on water saturated land that is cultivated. The erosion of land in the winter by spraying water at high rates can be greatly decreased by avoiding spraying at large rates that land that has been fall plowed or loosened. When land is plowed in the spring the summer rains compact the soil again by winter. Fall plowing is only practiced by farmers to allow earlier planting in the spring. But with well drained land the land dries out much sooner in the spring and a farmer can plow and plant much sooner anyway. And for most soils the biggest crops are produced by timely spring plowing.

To prevent erosion, crop residues, like corn stalks, can be shredded very finely at low cost and act as a cover for the land. Hilly land can be kept in sod crops, like alfalfa which pays very well when there is good drainage and plenty of fertilizer and irrigation water. Heavy applications of water are not applied until a very good sod builds up.

However the question of erosion is not a very serious question in many areas such as the Mid West where the clay soil averages perhaps 50 feet deep to bed rock. Though this lower or sub soil under normal conditions grows crops poorly, in this special case where good drainage is provided plus exactly the correct amount of irrigation water and plenty of fertilizer will always be put on, every thing is perfect for the crop anyway from the view point of soil. This is because the crop gets all it needs from the poor subsoil for maximum growth and the crop does not need to push its roots through a great depth of soil which procedure is what is so much easier to do in what is called the best soils. The only real problem is having to dredge the eroded off top soil out of the water storage lake 20 every few years which is only a minor expense. It is assumed that land hilly enough to have gullies form that interfer with farming operations will always be kept in sod crops, or at least have grass covered water ways where gullies might form.

The cooled water will be cold and since water at 4° Centigrade or 39° Fahrenheit has the greatest density for water, normally water at this temperature will lay in the bottom of the storage lake 20. The cold water, when needed for industrial cooling, flows out of the lake 20 by pipe line 15 to pump 13 which pumps it by pipe line 14 to its point of use. The cooling water after it has been used for cooling and has been warmed returns by pipe line 16 and lies in the top of the storage lake 20 since it has a lower density. The warm water in the winter flows by pipe line 18 to pump 8 which pumps it by pipe line 6 as previously mentioned to spray nozzle 5 where it is sprayed.

It is preferred that the storage lake 20 be at least 50 feet deep. In such a lake the temperature of the water stored will not warm up more that 1° Fahrenheit for storage during the warmer months. This depth is not as great as the depth of the clay above the bed rock in most of the flat area in the Mid West. Here the normal water level in the ground is from 3 to 15 feet below the surface of the ground and the use of a dredge supported by pontoons that can easily be taken apart and moved from storage lake to storage lake is very practical and low cost. Dredges can excavate earth at very low cost down to 75 feet in depth.

Of course, by building up dams around the sides, the water depth may be made much greater than what can be dug up from above the bed rock. However it is preferred to just dredge out a lake with the clay dredged out deposited on the sides of the storage lake 20. In this way care does not need to be greatly taken to compact clay around the sides and the bottom of lake 20 to prevent leakage. Of course plastic film can be used to at least greatly reduce and probably stop all leakage at very little cost.

It is preferred to put plastic film 17 on top the water in lake 20 to prevent currents caused by the wind mixing the water. A film of Tedlar plastic film supported by a film of polyethylene plastic is preferred. Tedlar is a trade mark of Du Pont and protects the polyethylene film against ultra violet rays. However Tedlar is heavier than water and needs the polyethylene film to support it on water.

It is to be noticed that tile 21 drains into storage lake 20 and the run off from the fields during warm weather will flow also into storage lake 20. The baffle 19 causes the warm water that will flow in to flow upwards. Normally the run off from Mid Western farm fields, if saved in wet weather and stored for periods of drought will provide all the water needed by crops to grow at maximum rates. Droughts lasting over a period of a few years do occur and normally one would not provide enough water storage to take care of such rare occurances. However whenever a long drought was noticed there would be plenty of time to increase the supply of water needed by pumping at a low rate from wells in nearby water containing rock formations.

It is greatly emphasized that the overall operation is very favorable from the view point of the farmer who must give permission for his land to be used. For good overall operation of the process good drainage must be provided. This is especially true if the industry (or city) plans to put their water soluble wastes or sewage water into water used for irrigation. This means the industry or city must put in more tile in about all locations. Since 70 percent of the farm land in the Mid West and in the other wetter sections of the country will be greatly improved by putting in more tile this will be greatly appreciated by the farmers. In the drier sections of the country there is the problem of salts building up in the irrigation water used. These salts will normally affect a field in spots long before the whole field is affected. By the disclosed invention with much recycling of the water local spots of excess salt will not build up and it is so much easier to watch and guard against excess salt in the water.

The farmer will, at no expense to the farmer, get an overhead spray system for irrigating his land that normally costs at least $500 per acre to install. It is greatly emphasized that an overhead permanent spray irrigation system is very valuable for a farmer besides just spraying on water during droughts. The farmer can apply fertilizer, insect spray or weed killer during periods of wet weather or when the height of the crops prevent him from entering his field, at very little expense by just mixing them in the water he sprays on. The farmer can prevent his crop from being damaged by frost by spraying the crop with water. For example Israelson and Hansen in their book *Irrigation Principles and Practices*, 3rd. Ed., 1962, Wiley, New York, page 333 say that crops have been saved in temperatures as low as 20° Fahrenheit by sprinkler irrigation.

On top of the tower 4 is an electric light 3 which gets its electricity from electric line 2. This allows the field to be illuminated during the night which results in a 10 to 25 percent additional increase in crop yields at low cost if you have the tower to put the electric light 3 on. Those in agriculture have found that by matching the color of the light to the color the crop most responds to that crop yields can be increased. Harold L. Merkle of the Dayton Power & Light Co., Dayton, Ohio in cooperation with the DeKalb Seed Corn Co. and the Sylvania Lighting Company reported work they had done in Ohio in Paper 71-833 of the American Society of Agricultural Engineers, Box 229, St. Joseph, Mich. They used 1000 watt bulbs on 25 foot high poles 160 feet apart.

Finally the installation of irrigation systems will allow a company to show a farmer at no expense that the polluting substances the company is not allowed to dump in a river can be handled by absorbing them in the farmer's soil and letting the bacteria destroy them. It is anticipated that practically all cities near land that can be irrigated will dispose of their sewage water by this method. When you consider that the cost of cleaning up this country's rivers is estimated to cost at least $70 billion the savings possible are obviously very large from this advantage alone.

It is pointed out that other things can be conveniently mounted on the towers as for example mirrors to reflect the sun's rays so many mirrors focus on one spot and thus heat water up to its boiling point. When we use the hot water to evaporate a liquid to a vapor that passes through a turbine that generates power and electricity, we very conveniently have the cold water to condense the low pressure expanded vapor. In this way electricity may be produced by about twice the amount of sunlight heat as compared with the heat from burning fossil fuels in a regular steam power plant. With the recent production of very low cost mirrors made from metallized plastic film which is mounted like drum heads over rings 4 feet in diameter, such electricity generated from sunlight becomes relatively cheap. With the storage of the hot water in lakes such electricity can be made dependable. The lakes need not be large since periods of cloudy weather rarely last over several weeks.

The mounting of mirrors that have to be rotated with the angle of the sun provides another reason for having electricity available at every tower used for spraying water. An advantage of having electricity at every pole is that the pipe 6 carrying the water to the spray nozzle 5 can be provided with an automatic electric heating system covered with insulation to keep the pipe from freezing if not properly handled in cold weather. An occasional flow of hot water through the pipe line 6 will easily keep the underground section of pipe line 6 from freezing. Just letting the section of pipe line 6 above the ground drain out should keep that section from freezing. That is assumed in the drawing. But an extra automatic electric heating unit like used commonly would guard against mistakes of operators.

An interesting modification of the use of mirrors mounted on the towers is to spray soapy water on the mirrors and keep the mirrors clean and operating at maximum efficiency. Also if electricity is to be used for lights or is going to be generated, in level country with the use of water storage lakes that are dredged out, the large electric power lines and transformers can be installed first and as a result the dredge used to dredge out the lakes will be provided with very convenient electric power, substantially reducing cost of dredging.

The height and spacing of the towers can be widely varied. For example towers 25 feet tall and spaced at 160 feet apart are normally preferred since this allows convenient spacing of the electric lights. However the invention is so favorable that towers as little as 2 feet tall can be used, though normally such a low height will not be high enough to provide irrigation of corn without corn stalks near the towers interfering with irrigation. It is normally greatly preferred to space the towers close enough together so that the water pressure available for the sprays on top of the towers will irrigate all the land between the towers.

I claim:

1. A method for obtaining cold water for cooling purposes during the summer months which comprises: erecting a tower in a farmer's field, spraying water to be cooled from the tower during the winter months and storing the cold water thus produced in a plastic film covered lake, using this cold water for cooling purposes during the summer time, replacing the cold water that has been heated by said cooling purposes at a higher elevation in the lake than from where it was removed from the lake, again spraying in the winter this last mentioned water from a tower in a farmer's field and thus cooling it again, and during the summer months spraying water from an above mentioned tower in a farmer's field to irrigate a farmer's field.

* * * * *